United States Patent Office 3,232,850
Patented Feb. 1, 1966

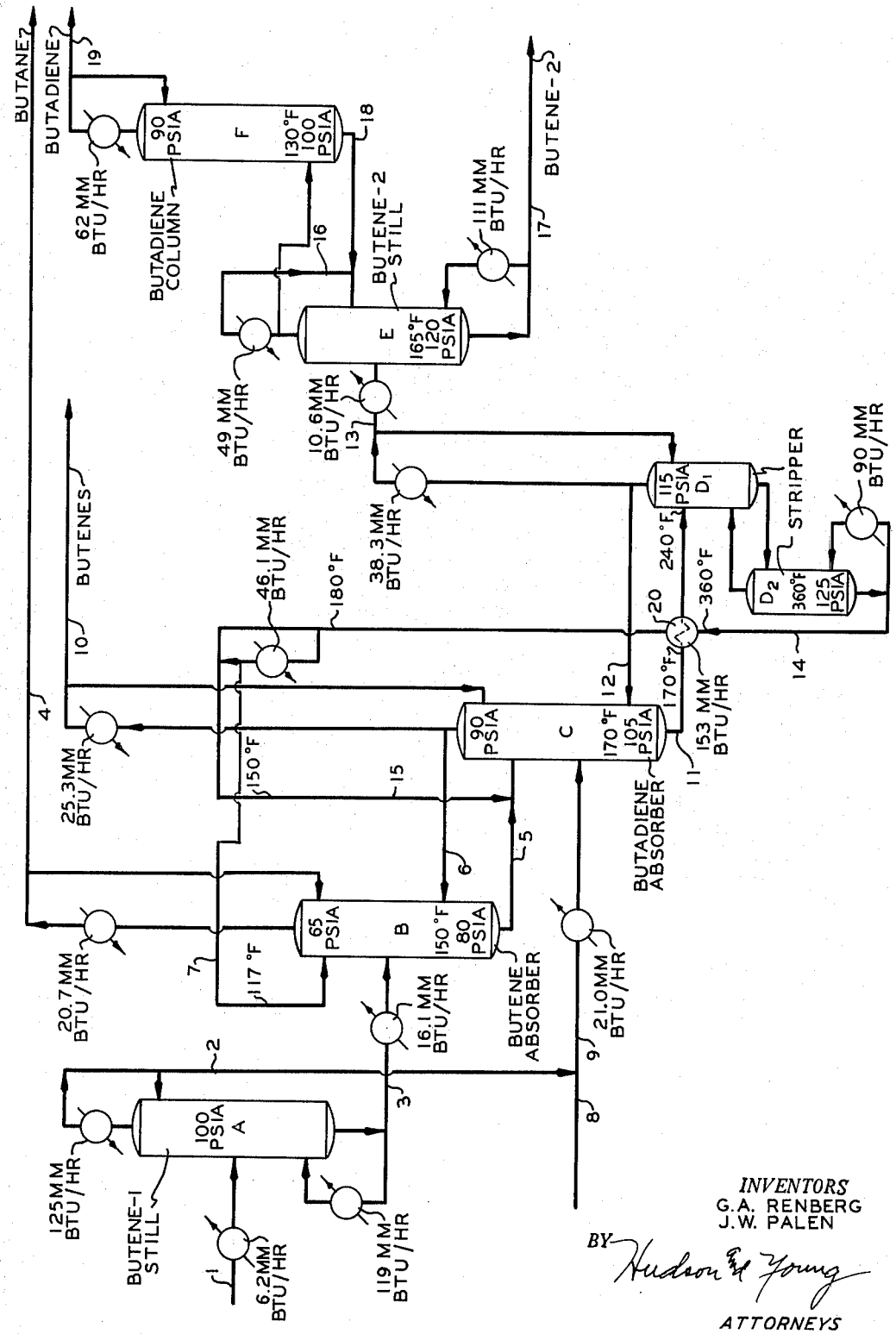

3,232,850
BUTENE AND BUTADIENE PURIFICATION BY PLURAL STAGE DISTILLATION
Graham A. Renberg and Joseph W. Palen, both of Bartlesville, Okla., assignors to Phillips Petroleum Company, a corporation of Delaware
Filed Oct. 27, 1961, Ser. No. 148,103
6 Claims. (Cl. 203—58)

This invention relates to separation and purification of butenes and of butadiene from hydrocarbon streams containing these materials. In one aspect it relates to process and means for separation and recovery of butenes and of butadiene from process streams containing these components with the expenditure of less heat energy than conventionally used. In another aspect it relates to the separation and recovery of butenes and butadiene by a process involving a novel arrangement of processing steps and apparatus.

In a commercial process for the manufacture of butadiene, including the following: (step 1) butane dehydrogenation to butenes; (step 2) butenes recovery and purification; (step 3) butenes dehydrogenation to butadiene; and (step 4) butadiene recovery and purification, the use of furfural as a selective solvent in the extractive distillation of butenes and of butadiene has made the process practical and economical. The use of furfural permits separations of $C_4$ hydrocarbons which were heretofore considered impossible and impractical on a commercial scale. It is this type of separation upon which the production of high purity butadiene depends. Furfural absorbers are used to separate normal butane from unsaturated $C_4$ hydrocarbons (step 2), and also for separating butadiene from butenes in the butadiene purification or recovery step (step 4). These absorber columns are of the conventional bubble cap type wherein the preferred modifications are constructed in two 50-tray sections. The function of the absorbers is to separate the product of that step from the recycle to the preceding step while the remainder of the columns (fractionators) function on the whole as auxiliary columns to increase the absorber feed purity or to process the by-products streams. Since butenes in the normal butane recycle to the (step 1) dehydrogenation and butadiene in the butene recycle to (step 3) dehydrogenation are partially destroyed over the dehydrogenation catalyst, substantial losses are suffered when inferior operation of the absorbers occurs. In addition, normal butane in the kettle product takes a "free ride" through the butene dehydrogenation step, acting as a diluent. Also, butenes in the kettle product of the (step 4) absorbers unnecessarily overload the butadiene purification column downstream of the absorber. The term absorber, absorbers, extractive distillation column or columns are used interchangeably herein.

As indicated hereinabove, the conventional manufacturing of butadiene by two-stage catalytic dehydrogenation of butane and of butylene, respectively, is well known. In one typical process the purification train comprises two fractionators and two extractive distillation or absorption columns. The first of the fractionators serves primarily to separate butene-1 from butene-2. The bottoms from the butene-1 column, comprising essentially n-butane and butenes-2, is passed to a butene absorber which absorbs the bulk of the butenes-2. Normal butane is rejected as an overhead stream and is recycled to the original dehydrogenation step. Overhead vapor from the butene-1 fractionator comprises essentially butene-1 and a small amount of butadiene and is combined with overhead vapors from the butene-2 column which comprises essentially butene-1 and butadiene. The feed to the butene-2 column is a deoiled and depropanized stream comprising essentially butadiene and normal butenes. The combined overhead vapors from the butene-1 and the butene-2 fractionators are then passed to a butadiene absorber in which butadiene is absorbed in a selective solvent.

One of the major costs in this conventional method of production of butadiene is in the energy requirements demanded by the purification steps associated with the process. The purification steps involve essentially a series of fractionation and extractive distillation or absorption steps.

An object of this invention is to provide a process and apparatus for separation and recovery of butenes and of butadiene from process streams containing these components with the expenditure of less heat energy than conventionally used. Another object of this invention is to provide a process and apparatus for the separation and recovery of butenes and of butadiene by a process involving a novel arrangement of processing steps and apparatus. Still other objects and advantages will be realized upon reading the following description which, taken with the attached drawing, forms a part of this specification.

The drawing illustrates, in diagrammatic form, an arrangement of apparatus parts for carrying out the process of this invention.

We have now found that purification energy requirements can be substantially reduced by using rich solvent from the butene-1 absorber or extractive distillation tower, without stripping, as the solvent feed to the butadiene absorber. We have also found that the overhead vapors from certain of the separation facilities can be used to reboil the absorbers, thereby eliminating the need for reboilers ordinarily associated with extractive distillation columns.

In addition to energy savings, we have found that certain of the fractionators in the recovery system can be eliminated or rearranged in the process train with the result that certain smaller fractional distillation columns can be used than in the prior art.

In one embodiment of this invention a stream containing n-butane and butene isomers is passed to a butenes absorber in which butenes are absorbed in a selective solvent, such as furfural. The rich furfural stream is passed, without stripping, to the top of the butadiene absorber which operates on a hydrocarbon feed stream comprising essentially butadiene and butene-1. A portion of the overhead vapors from the butadiene absorber is used to reboil the butenes absorber. This reboiling of the butenes absorber by the portion of overhead vapors from the butadiene absorber provides all of the required reboiling heat necessary for reboiling the butenes absorber and accordingly a conventional fired or steam heated reboiler is not required. In the butadiene absorber, substantially all of the butadiene in the feed to the column is absorbed. The solvent, rich in butadiene, is passed to strippers which strip butadiene from the solvent. A portion of the stream of butadiene vapors issuing from the stripper overhead is introduced into the lower portion of the butadiene absorber for boil-up and for reboiling purposes. In this respect this portion of the stripped butadiene vapors provides all of the reboiling heat required for the butadiene absorber thus replacing conventional fired or steam heated reboiler coils.

As another improvement, the butenes-2 fractionator, which is ordinarily positioned at the beginning of the (step 4) purification stream, is placed between the stripper and the final butadiene fractionation column. By virtue of this arrangement the feed to the butenes-2 fractionator is considerably less in volume and the same butadiene, butenes-2 separation is obtained with considerably less reflux than when the butenes-2 column is positioned prior to the butenes-2 absorber. In this case vapors from the butenes-2 fractionator are partially condensed for reflux purposes and the remainder of butenes-2 column overhead is passed directly into the lower portion of the butadiene fractionation column. The kettle product from this butadiene fractionation column is passed into the top of the butenes-2 fractionator as the remainder of the reflux therefor.

On reference to the drawing, reference numeral 1 identifies the conduit through which a hydrocarbon stream passes from the step 1 n-butane dehydrogenation step. Specifically this stream originates as a deoiler overhead product following the normal butane dehydrogenation step. This stream passes into a butene-1 column or fractional distillation column A which separates butene-1 and a small amount of butadiene as overhead material from a bottoms product of normal butane and butene-2 isomers. This bottoms product passes through a conduit 3 into about the mid-section of a butene extractive distillation column or absorber B which extractively distills this feed material in the presence of a selective solvent, such as furfural, from a conduit 7 and in the further presence of a hot vaporous stream of hydrocarbon subsequently produced. Column B separates an overhead stream comprising essentially normal butane and this material passes through a conduit 4 as recycled butane to the original normal butane catalytic dehydrogenation step, not shown. The bottoms material from column B or extract is withdrawn therefrom through a conduit 5 and this material comprises essentially butene-1 and butene-2 isomers with minor proportions of normal butane and butadiene. This stream is passed into an extractive distillation column or absorber C into which is passed another stream of hydrocarbon through conduit 9 for extractive distillation therein. The stream flowing through conduit 9 is composed of two parts, that part originating from column A through conduit 2 and another portion entering the system through conduit 8. This material flowing through conduit 8 is a depropanizer bottoms material originating in the catalytic dehydrogenation of butenes in (step 3) of the general process. This mixed stream in conduit 9 is thus extractively distilled in the presence of the furfural-rich stream from conduit 5. In some cases additional lean furfural, subsequently defined, enters the upper portion of column C through a conduit 15. A hot vaporous stream enters the lower portion of column C through a conduit 12 from a source, subsequently described, for providing all of the boil-up for reboiling this absorber. The overhead vapor produced from column C is rich in butenes and contains only a minor proportion of normal butane and butadiene and a portion of this stream is passed through said conduit 6 for boil-up purposes in the butene absorber B. The make product from the overhead of the butadiene absorber C passes through a conduit 10 as recycle to the (step 3) butenes catalytic dehydrogenation step. This recycle stream is rich in butene-1, in butene-2 isomers and contains only a very minor proportion of normal butane and butadiene. The furfural-rich extract stream from the bottom of column C is passed through a conduit 11 into stripping zones $D_1$ and $D_2$. While strippers $D_1$ and $D_2$ are illustrated herein as being separate columns, they can, if desired, be a single column or preferably as shown, two columns positioned side by side for limitation of height. These two column sections, $D_1$ and $D_2$ operate serially and the lean or fully stripped furfural is withdrawn from the bottom portion of the column $D_2$ and is passed through a conduit 14 in indirect heat exchange with the bottoms material from absorber C in exchanger 20. The make overhead product from stripper $D_1$ is passed through a conduit 13 into a butene-2 distillation column E. This stream is rich in butadiene and butene-2 isomers. In this column substantially all of the butadiene is taken overhead for further processing and purification in a butadiene fractionating column F. A portion of butadiene-rich overhead vapors from column E is condensed and this condensate is returned to the top of column E as a portion of the reflux therefor and the remainder of the overhead product from column E is passed into a lower portion of the butadiene fractionator F. A pure butadiene product is withdrawn from butadiene column F through a conduit 19 and is passed to a point of disposal, or further processing, not shown. The bottoms product from the butadiene column F, which is still rich in butadiene and butene-2 isomers, is returned through a conduit 18 and is passed into the upper portion of the butene-2 column E as a remainder of the reflux thereto. The bottoms material from butene-2 column E is withdrawn through conduit 17 and is passed to a butene-2 isomer deoiler, not shown. This material in conduit 17 is rich in butene-2 isomers and contains only a very minor portion of butadiene.

As will be noted from the drawing, there is not a conventional reboiler in the kettle section of the butene absorber B nor in the kettle section of the butadiene absorber C. Each of the overhead product streams from column C and from column $D_1$ is divided into two portions. One portion from column C passing through conduit 6 as boil-up provides the reboiler heat for absorber B while that portion of the overhead stream from column or stripper $D_1$, passing through conduit 12, provides all of the boil-up and reboiler heat for use in the kettle section of absorber C.

By positioning the butene-2 fractionating column E in the position illustrated in the drawing, that is, between the strippers $D_1$, $D_2$, and the butadiene column F, a much smaller butene-2 column can be used because the volume of the charge stock flowing through conduit 13 is much smaller than when the butene-2 column is placed in conduit 8 in the conventional process.

In the following Table I are shown stream compositions in various conduits of the process illustrated in the drawing.

TABLE I

| Material Balance, mols per hour | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Butene-1 | 256 | 253 | 3 | 3 | 1,470 | 1,470 | | 612 | 865 | 863 | 11 | 9 | 2 | | | 2 | | | 2 |
| Butadiene | 83 | 83 | | | 8 | 8 | | 412 | 495 | 15 | 2,580 | 2,100 | 480 | | | 4,700 | 6 | 4,234 | 474 |
| n-Butane | 1,533 | 9 | 1,524 | 1,513 | 62 | 51 | | 10 | 19 | 30 | | | | | | | | | |
| t-Butene-2 | 262 | 1 | 261 | 14 | 855 | 608 | | 545 | 546 | 357 | 2,386 | 1,950 | 436 | | | 1,600 | 435 | 1,599 | 1 |
| c-Butene-2 | 262 | | 262 | | 788 | 526 | | 545 | 545 | 313 | 2,694 | 2,200 | 494 | | | 900 | 494 | 900 | |
| Furfural* | | | | | 61,800 | | 16,800 | | | | 22,000 | | | 22,000 | 5,200 | | | | |
| Total | 2,396 | 346 | 2,050 | 1,530 | 19,983 | 2,663 | 16,800 | 2,124 | 2,470 | 1,578 | 29,671 | 6,259 | 1,427 | 22,000 | 5,200 | 7,202 | 935 | 6,733 | 477 |

*Furfural contains: 5 wt. percent water, 6.7 wt. percent oil.

In the drawing also are given the various heat loads at various process points of the system.

Reflux temperatures downstream from each respective condenser are: in conduit 2, 120° F.; in conduit 10, 120° F.; in conduit 4, 110° F.; in conduit 13, 120° F.; in conduit 16, 130° F.; and in conduit 19, 120° F. Reflux volume ratio in column B is 6 to 1, furfural to feed, and in column C is 6.5 to 1, furfural to feed.

While furfural has been disclosed herein as the solvent used in columns B, C, $D_1$ and $D_2$, furfural containing a small percentage of water is usually used in these columns.

In Table II are shown the various amounts of steam at 30 p.s.i.g. (pounds per square inch gage) and at 300 p.s.i.g. required for the operation of various heating steps in the operation.

TABLE II

*Steam consumption in Steps 2 and 4*

FURFURAL COLUMNS AND HYDROCARBON FRACTIONATORS

[Lb./hr. steam]

|  | Present operation | | The invention | |
| --- | --- | --- | --- | --- |
|  | 30 p.s.i.g. | 300 p.s.i.g. | 30 p.s.i.g. | 300 p.s.i.g. |
| Step 2 absorbers | 12,000 | 207,000 | 17,400 | |
| Step 2 strippers | | 50,400 | | |
| Step 4 absorbers | 7,800 | 130,000 | 22,700 | |
| Step 4 strippers | | 55,000 | | 112,500 |
| B-1 column | 155,100 | | 155,100 | |
| B-2 column | 195,000 | | 131,500 | |
| Steam credit for furfural utilization | −167,000 | | | |
| Additional steam to Bn column | | | −84,000 | |
| Total steam | 202,900 | 442,400 | 242,700 | 112,500 |
| Total MM B.t.u./hr. | 545 | | 317 | |
| Fuel savings at 75% boiler efficiency— $/yr. (18¢/MM B.t.u.) | 0 | | $430,000 | |

The first double column illustrates the steam requirements in terms of pounds per hour of steam in the present conventional operation while the second double column illustrates the steam requirements at the various process points according to this invention. In the lower portion of these columns across from the legend "total mm. B.t.u.'s/hr." are given the values 545 and 317. These values represent the heat requirements in terms of millions of B.t.u.'s per hour total for the present conventional operation and for the operation according to this invention. Please note that the B.t.u. requirements for the operation according to this invention are about 60 percent of that required in the conventional operation. The money value of these heat savings is calculated considering 75 percent boiler efficiency with fuel costing 18¢ per million B.t.u. and is based on the present operation at "zero" and the operation according to this invention has an advantage of $430,000. That is, it is $430,000 per year, which saving is a considerable saving in the steam requirements for such an operation.

While certain embodiments of the invention have been described for illustrative purposes, the invention obviously is not limited thereto.

We claim:

1. A process comprising the steps of passing a feed stock comprising furfural, butadiene and cis and trans butenes-2 substantially free of butenes-1 into a hydrocarbon stripping zone and therein stripping said butadiene and cis and trans butenes-2 from the furfural, distilling the stripped material thereby producing an overhead product comprising butadiene containing minor proportion of said butenes-2 and a bottom product consisting essentially of butenes-2, further distilling said overhead product thereby producing an overhead product of substantially pure butadiene and a bottoms product of butadiene containing minor proportions of said butenes-2, and returning this bottoms product to the first mentioned distilling step as reflux and withdrawing bottoms from this first mentioned distilling step and said overhead product of substantially pure butadiene as products of the operation.

2. A process comprising the steps of passing a feed stock comprising furfural, butadiene and cis and trans butenes-2 substantially free of butenes-1 into a hydrocarbon stripping zone and therein stripping these hydrocarbons from said furfural, distilling the stripped hydrocarbons thereby producing an overhead vaporous distillate product comprising butadiene and cis and trans butenes-2, and a first bottoms product of cis and trans butenes-2, condensing a fraction of this distillate thereby producing condensate and uncondensed vapors, from this condensed fraction separating condensate and returning same to the distillation step as a portion of the reflux therefor, passing the remainder of said distillate into a distillation zone as feed stock thereto and distilling same and thereby producing an overhead product of butadiene and a second bottoms product of butadiene containing minor proportions of cis and trans butenes-2, returning this latter bottoms product to the first mentioned distilling step as the remainder of the reflux thereto, withdrawing said overhead product of butadiene and said second bottoms product of cis and trans butenes-2 as products of the operations.

3. A process comprising the steps of passing a feed stock comprising furfural, butadiene and cis and trans butenes-2 substantially free of butenes-1 into a hydrocarbon stripping zone and therein stripping these hydrocarbons from said furfural, distilling the stripped hydrocarbons thereby producing an overhead vaporous distillate product comprising butadiene and cis and trans butenes-2 and first bottoms product of cis and trans butenes-2, condensing a portion of this distillate thereby producing condensate and uncondensed vapors, from this condensed portion separating condensate and returning same to the distillation step as a portion of the reflux therefor, passing the remainder of said distillate into a distilling zone as the sole feed stock thereto and therein producing an overhead product of butadiene and a second bottoms product of butadiene and cis and trans butenes-2, cycling this latter bottoms product to the first mentioned distilling step as the remainder of the reflux thereto, withdrawing said overhead product of butadiene and said first bottoms product as products of the operation.

4. A process for reducing the energy requirements of a distillation system comprising extractively distilling a first feed stock resulting from the catalytic dehydrogenation of n-butane and comprising n-butane and cis and trans butenes-2 using furfural as a solvent and in admixture with a first hot vaporous stream thereby producing a first overhead product comprising n-butane and a first bottoms product of butene-1, cis and trans butenes-2 and minor amounts of n-butane and butadiene in furfural, extractively distilling a second feed stock resulting from the catalytic dehydrogenation of n-butane, butene-1 and butenes-2 and comprising butene-1, butadiene, cis and trans butenes-2 and a minor amount of n-butane in admixture with said first bottoms product as a solvent and in admixture with a second hot vaporous stream thereby producing a first hot vaporous overhead stream comprising butene-1, cis and trans butenes-2 with minor amounts of butadiene and n-butane, a portion of this hot vaporous overhead stream being said first hot vaporous stream, and producing a second bottoms product of furfural, butadiene, cis and trans butene-2 with a minor amount of butene-1, stripping these hydrocarbons from the furfural of said second bottoms product thereby producing a lean furfural as the first mentioned furfural and a second hot vaporous overhead stream comprising butadiene, cis and trans butenes-2 with a minor amount of butene-1, a portion of this second hot vaporous overhead stream being said second hot vaporous stream, distilling the remainder of this second hot vaporous overhead stream thereby producing a third bottoms product of cis and trans butenes-2 and a third overhead vaporous stream, cooling and condensing a portion of this latter vaporous stream and returning a portion of the condensate therefrom to the latter mentioned distillation step as a portion of the reflux thereto, pasing the remainder of this latter overhead stream into a final distilling step as the sole feed thereto and therein producing an overhead butadiene product of the process and a fourth bottoms product of butadiene and cis and trans butenes-2 and returning this fourth bottoms product as the remainder of the reflux to the distilling operation producing the third bottoms product, and withdrawing said third bottoms product as another product of the process.

5. A method for the separation and recovery of butadiene from a first feed stream produced in the catalytic dehydrogenation of n-butane and a second feed stream produced in the catalytic dehydrogenation of butene-1 and cis and trans butenes-2, said feed streams comprising n-butane, butene-1, butadiene and cis and trans butenes-2, comprising distilling said first feed stream thereby producing a first overhead product comprising butene-1 with minor amounts of butadiene and n-butane and a first bottoms product comprising n-butane with minor amounts of cis and trans butenes-2, extractively distilling said first bottoms product using furfural as solvent and a first hot vaporous boil-up stream as subsequently produced and thereby producing a second overhead product comprising n-butane with a minor amount of trans butene-2 and a first extract phase comprising furfural containing butene-1, cis and trans butenes-2 with minor amounts of butadiene and n-butane, extractively distilling said first overhead product and said second feed stream admixture with said first extract phase and a second hot vaporous boil-up stream thereby producing a third hot vaporous overhead product comprising butene-1, cis and trans butenes-2 with minor amounts of n-butane and butadiene and a second extract phase comprising furfural, butadiene and minor amounts of butene-1, cis and trans butenes-2, stripping absorbed constituents in a stripping operation thereby producing a fourth hot vaporous overhead product and a second bottoms product comprising furfural dividing this second bottoms product into two portions, returning one portion to the first mentioned extractive distillation step as the furfural therein and adding the remainder to the second mentioned extractive distillation step, a portion of said third overhead product being said first boil-up stream and the remainder being a butenes product of the operation, a portion of said fourth overhead product being said second boil-up stream and the remainder being a butadiene product of the operation.

6. An apparatus comprising in combination, a first fractional distillation column having a feed inlet and an overhead and bottoms material outlets; a first extractive distillation column free of a reboiler and having a feed inlet in communication with the bottoms outlet of said first fractional distillation column, hot vapor stream and solvent inlets, and overhead and bottoms products outlets; a second extractive distillation column free of a reboiler and having a feed inlet communicating with the bottoms outlet of said first extractive distillation column, a hot vaporous stream inlet, and overhead vapor and bottoms products outlets, this latter overhead vapor outlet communicating with said hot vaporous stream inlet to said first extractive distillation column; a stripping still having a feed inlet communicating with the bottoms outlet of said second extractive distillation column, overhead vapor and bottoms liquid outlets, this latter overhead vapor outlet communicating with said hot vaporous stream inlet of said second extractive distillation column, the stripping still bottoms outlet communicating with the solvent inlet of said first extractive distillation column and with the feed inlet of said second extractive distillation column; a second distillation column having a feed inlet communicating with the overhead outlet of said stripping still, an overhead outlet with condensing means therein, a reflux inlet and overhead and kettle products outlets; and a third distillation column having a feed inlet communicating with the overhead product outlet of said second distillation column, a kettle product outlet communicating with said reflux inlet of said third column, and an overhead product outlet.

References Cited by the Examiner

UNITED STATES PATENTS

| | | | |
|---|---|---|---|
| 2,379,332 | 6/1945 | Arnold | 260—681.5 |
| 2,395,016 | 2/1946 | Schulze et al. | 260—681.5 |
| 2,619,814 | 12/1952 | Kniel | 202—75 X |
| 2,750,435 | 6/1956 | Fetchin | 202—39.5 X |
| 3,004,083 | 10/1961 | Siedenstrang et al. | |
| 3,059,037 | 10/1962 | Cahn | 202—39.5 X |

FOREIGN PATENTS 776,154   6/1957   Great Britain.

NORMAN YUDKOFF, *Primary Examiner.*
ALPHONSO G. SULLIVAN, *Examiner.*